United States Patent
Strnad et al.

(10) Patent No.: US 10,123,487 B2
(45) Date of Patent: Nov. 13, 2018

(54) CLEAN GRAIN ELEVATOR PADDLES FOR A COMBINE HARVESTER

(71) Applicant: Precision Planting LLC, Tremont, IL (US)

(72) Inventors: Michael Strnad, Delavan, IL (US); Justin Koch, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 0 days.

(21) Appl. No.: 15/985,675

(22) Filed: May 21, 2018

(65) Prior Publication Data

US 2018/0263187 A1    Sep. 20, 2018

Related U.S. Application Data

(63) Continuation of application No. 14/762,463, filed as application No. PCT/US2014/012367 on Jan. 21, 2014, now Pat. No. 9,974,238.

(60) Provisional application No. 61/754,948, filed on Jan. 21, 2013.

(51) Int. Cl.
| | |
|---|---|
| *B65G 19/00* | (2006.01) |
| *A01D 41/127* | (2006.01) |
| *G01F 1/30* | (2006.01) |
| *A01F 12/46* | (2006.01) |
| *A01D 41/12* | (2006.01) |
| *G01F 1/80* | (2006.01) |
| *G01F 15/02* | (2006.01) |
| *G01F 15/00* | (2006.01) |

(52) U.S. Cl.
CPC .............. *A01F 12/46* (2013.01); *A01D 41/12* (2013.01); *G01F 1/30* (2013.01); *G01F 1/80* (2013.01); *G01F 15/00* (2013.01); *G01F 15/028* (2013.01)

(58) Field of Classification Search
CPC ............................ A01D 41/127; B65G 19/00
USPC .......... 198/716, 728, 730; 56/16.6, 185, 189
See application file for complete search history.

(56) References Cited

U.S. PATENT DOCUMENTS

| | | | | |
|---|---|---|---|---|
| 3,589,500 | A * | 6/1971 | Hansen ................. | B65G 31/04 198/601 |
| 4,562,918 | A * | 1/1986 | Tschernatsch ......... | B65G 15/12 198/509 |
| 4,860,884 | A * | 8/1989 | Kostrewa ............. | B65G 67/606 198/509 |
| 5,318,475 | A * | 6/1994 | Schrock ............. | A01D 41/1271 460/1 |
| 5,496,215 | A * | 3/1996 | Underwood ....... | A01D 41/1208 460/114 |
| 5,561,250 | A * | 10/1996 | Myers .................... | A01C 7/105 73/861.73 |
| 5,736,652 | A * | 4/1998 | Strubbe .............. | A01D 41/1271 73/861.73 |

(Continued)

*Primary Examiner* — Douglas A Hess
(74) *Attorney, Agent, or Firm* — Thomas J. Oppold; Larkin Hoffman Daly & Lindgren, Ltd.

(57) ABSTRACT

A grain paddle for a clean grain elevator of a combine harvester. The paddle includes a substantially rigid body with a planar portion having ends disposed distal and proximal to an elevator chain of the combine harvester. Some paddle embodiments include an angled end adjacent the proximal end of the planar portion. Some paddle embodiments include an angled end adjacent to the distal end of the planar portion. Some paddle embodiments include sloped lateral edges.

20 Claims, 7 Drawing Sheets

(56) References Cited

U.S. PATENT DOCUMENTS

| | | | | |
|---|---|---|---|---|
| 5,959,218 | A * | 9/1999 | Strubbe | A01D 41/1271 73/861.71 |
| 5,970,802 | A * | 10/1999 | Strubbe | G01F 1/76 73/861.71 |
| 6,185,990 | B1 * | 2/2001 | Missotten | A01B 79/005 324/691 |
| 6,192,664 | B1 * | 2/2001 | Missotten | A01D 41/1274 460/1 |
| 6,272,935 | B1 * | 8/2001 | Strubbe | G01F 1/206 73/861.73 |
| 6,508,049 | B1 * | 1/2003 | Cox | A01D 45/10 56/10.2 R |
| 6,899,616 | B1 * | 5/2005 | Murray | A01D 75/28 460/6 |
| 7,520,378 | B2 * | 4/2009 | Hansen | E01H 1/042 198/716 |
| 9,506,786 | B2 * | 11/2016 | Strnad | A01D 41/1272 |
| 9,516,817 | B2 * | 12/2016 | Temple | A01F 12/46 |
| 9,974,238 | B2 * | 5/2018 | Strnad | A01F 12/46 |

* cited by examiner

CLEAN GRAIN ELEVATOR PADDLES FOR A COMBINE HARVESTER

BACKGROUND

Referring to FIG. 1, when harvesting crops with agricultural harvester combine 10, the crop being harvested is cut or collected as the combine traverses the field, by the head or header 12 mounted to the forward end of the combine 10. The header 12 feeds the crop into the feeder house 14 which carries the crop to the thresher, indicated generally by reference numeral 16 within the interior of the combine 10. The thresher 16 removes the grain from the plant material (e.g., the stalk, cob, pods or other plant material depending on the crop being harvested). The threshed grain then passes through sieves, indicated generally by reference numeral 18, which separate the grain from the unwanted plant debris. The unwanted plant debris is passed toward the back of the combine where it is discharged. The sieved "clean" grain is directed toward and is collected at the bottom of the clean grain elevator 22. The clean grain elevator 22 lifts the collected clean grain upward into a discharge area 24. An auger 26 within the discharge area 24 carries the grain into a holding tank or hopper 28. As the hopper 28 begins to fill, the grain is unloaded as needed by the unloading auger 30 into a waiting grain cart, wagon, truck or other transport (not shown).

Referring to FIGS. 1 and 2, the clean grain elevator 22 is disposed within a housing 32 and is comprised of a chain 34 which passes around upper and lower sprockets 36, 38. A plurality of equally spaced flights or paddles 40 are attached to the chain 34. As the chain 34 is rotated by the sprockets 36, 38 the paddles 40 scoop the grain being collected at the bottom of the elevator 32 and lift it upward toward the top of the elevator housing 32. As the paddles 40 pass over the upper sprocket 36, the grain is thrown into the discharge area 24 as illustrated in FIG. 2.

In many combines, a yield sensor 50 is positioned in the discharge area 24. While there are many types of yield sensors, a common yield sensor 50 includes an impact plate 52. The impact plate 52 is positioned so that when the grain is being thrown by the paddles 40 as the paddles 40 pass over the upper sprocket 36, the grain "impacts" the impact plate 52. The impact of the grain causes the impact plate 52 to displace which generates a signal. The signal generated due to the displacement of the plate 52 correlates to the amount of grain impacting the plate which correlates to yield. However, in operation of yield sensors for which a layer of grain imposes a centrifugal force on the yield sensor, empirical studies have shown that conventional paddles generate inconsistent signals at the yield sensor, particularly at low grain flows. Accordingly, there is a need for an improved paddle for clean grain elevator of a combine that will throw the grain in a manner so as to obtain a more accurate and consistent yield measurements.

DESCRIPTION

Figure 1:
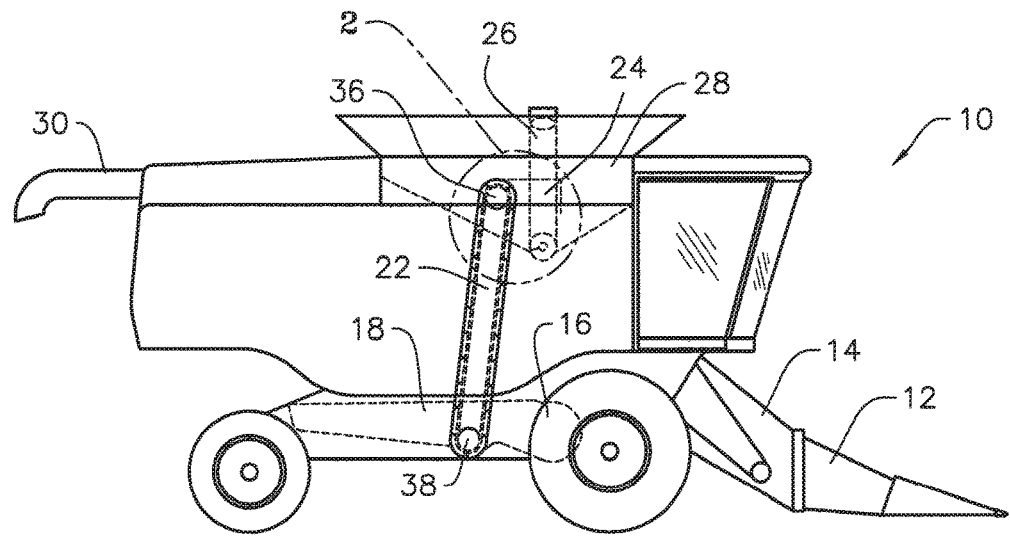
FIG. 1 is a side elevation view of a conventional combine.
Figure 2:
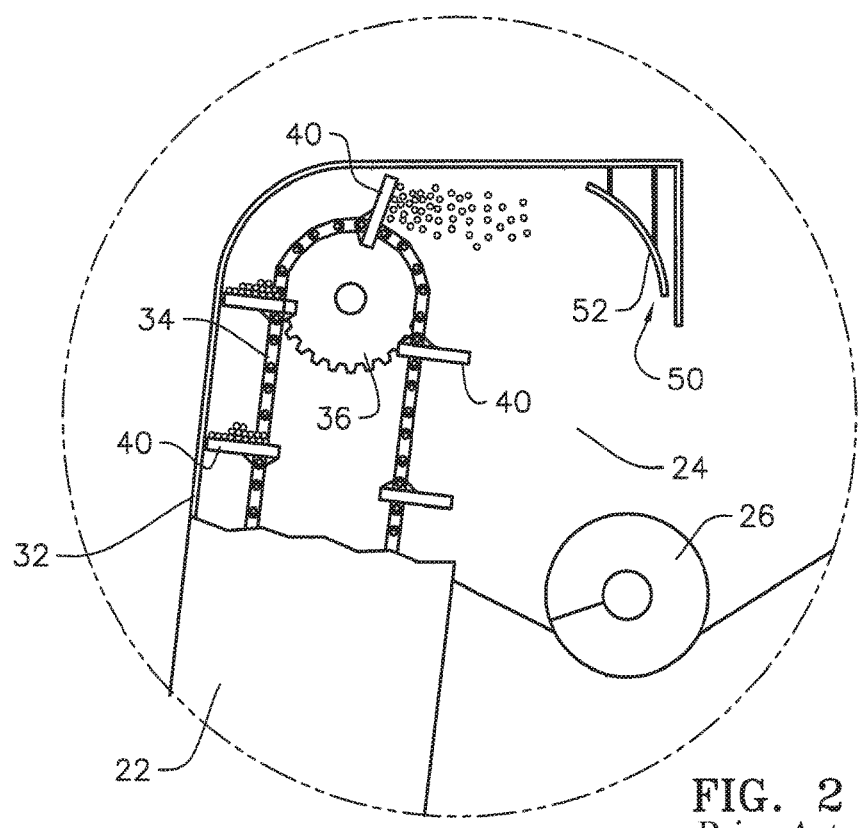
FIG. 2 is an enlarged view of the circled portion of FIG. 1, illustrating how prior art paddles tend to scatter or spray the grain as the grain is thrown toward the yield sensor.

Referring now to the drawings, wherein like reference numerals designate identical or corresponding parts throughout the several views, FIG. 1 is a side elevation view of a conventional combine 10 with a partial cut-away view of the clean grain elevator 22 and showing a yield sensor 50 disposed at the top of the clean grain elevator 22. FIG. 2 is an enlarged view of the circled portion of FIG. 1. The clean grain elevator 22 is disposed within a housing 32 and is comprised of a chain 34 which passes around upper and lower sprockets 36, 38. A plurality of equally spaced flights or paddles 40 are attached to the chain 34. As the chain 34 is rotated by the sprockets 36, 38 the paddles 40 scoop the grain being collected at the bottom of the elevator 32 and lift it upward toward the top of the elevator housing 32. As the paddles 40 pass over the upper sprocket 36, the grain is thrown into the discharge area 24.

Conventional paddles 40 are generally rectangular in shape and are substantially planar. Some conventional paddles 40 have a slight cup or concave shape in the direction transverse to the chain 34. Conventional paddles are also typically constructed of recycled tires so they are somewhat flexible and become irregularly shaped during use due to elastic deformation and after use due to plastic deformation. The flexibility and irregular shape of conventional paddles 40 results in inconsistent grain piles on the paddles as the grain is being lifted by the elevator 22. Because impact-type yield sensors generate signals based on the amount of displacement of the impact plate due to impact of the grain, if the grain piles on the paddles are not consistent due to the flexibility or irregular shape of the paddles, the signals generated will likewise be inconsistent which translates into inaccuracies in yield measurements. Furthermore, when these flexible, irregularly shaped paddles pass over the upper sprocket, they tend to scatter the grain as it is thrown toward the yield sensor as illustrated in FIG. 2 which further contributes to inconsistent and inaccurate signals generated by the yield sensor.

Figure 3:
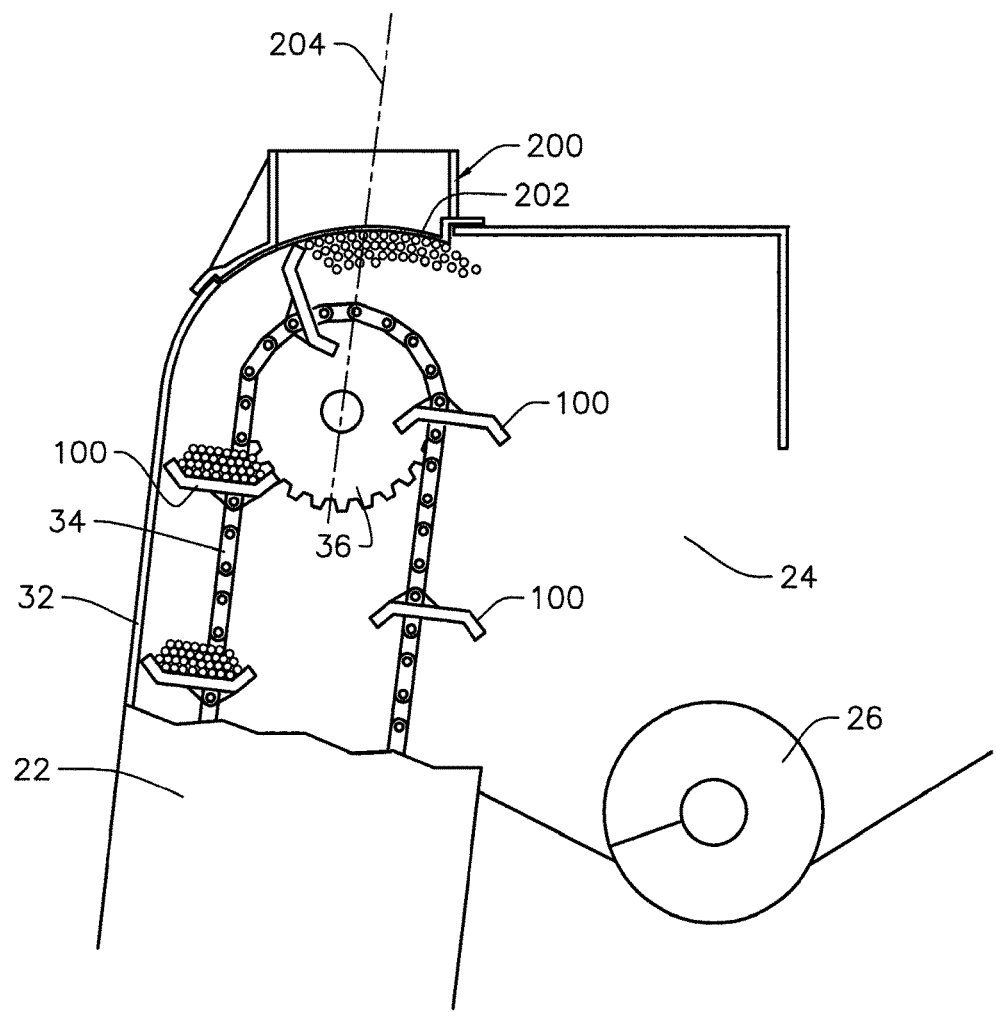
FIG. 3 is an illustration of the same view of the clean grain elevator as in FIG. 2, but showing how the improved paddles direct the grain in a more contiguous mass toward a mass flow sensor positioned proximate the upper sprocket of the clean grain elevator.
Figure 4A:
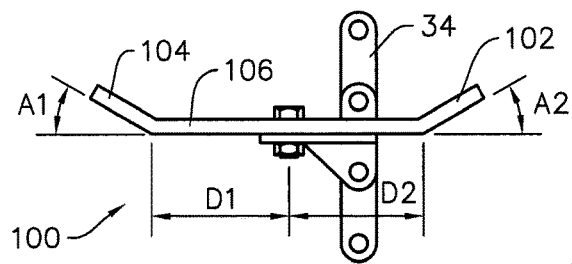
FIGS. 4A-4F are side elevation views of several embodiments of an improved paddle.
Figure 4B:
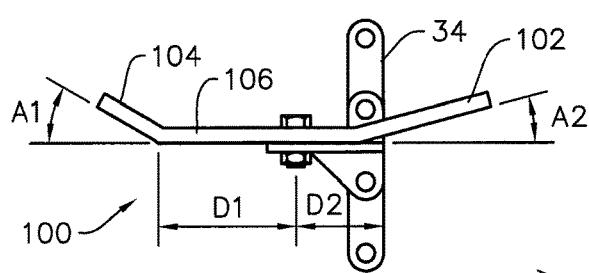
Figure 4C:
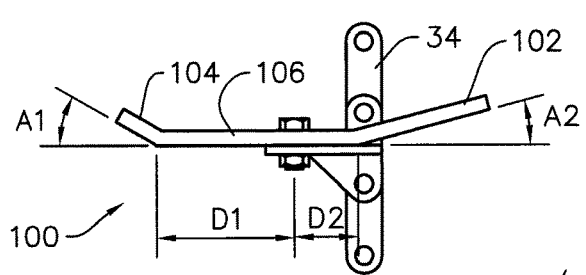
Figure 4D:
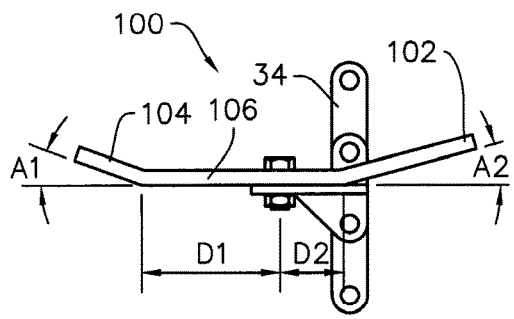
Figure 4E:
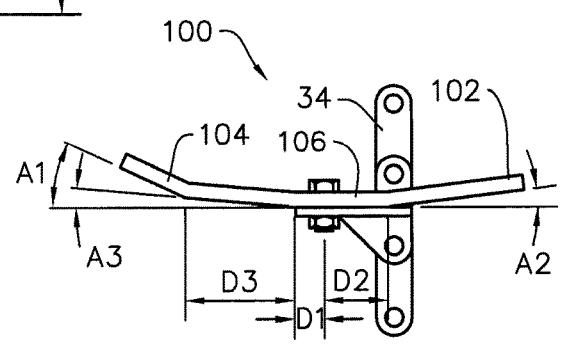
Figure 4F:
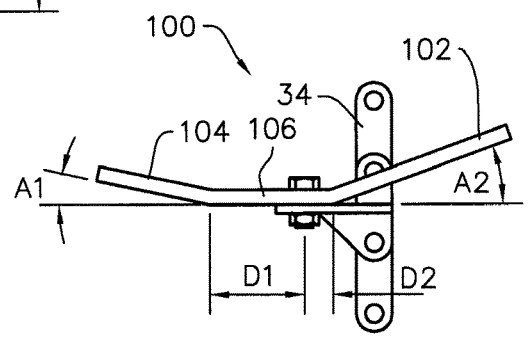

FIG. 3 is an illustration of a partial cut-away view of the upper end of a clean grain elevator similar to FIG. 2, but in FIG. 3, the conventional paddles 40 are replaced with improved paddles 100. The improved paddles 100 are configured with fore and aft sloped ends 102, 104 extending from a substantially planar middle portion 106. The improved paddles 100 are constructed of substantially rigid, wear resistant material which will maintain its shape during use. Such material may include thermoplastic polyethylene such as high density polyethylene (HDPE), ultra high molecular weight (UHMW) polyethylene or another material with like properties. In other embodiments, the improved paddles 100 are constructed of stainless steel or another rigid metal. The paddles 100 mounted to the chain 34 are preferably substantially identical such that a substantially identical grain pile is carried up the elevator and thrown toward the sensor 200 by each paddle 100. The overall length and width of the improved paddle 100 is substantially the same as the overall length and width of a conventional paddle 40 and may incorporate the same means of attachment to the elevator chain 34 as a conventional paddle 40. Thus, no change needs to be made to the sprockets 36, 38, to the chain 34 or to the elevator housing 32 to replace or retrofit the clean grain elevator 22 of an existing combine 10 to utilize the improved paddles 100, nor is there a need for an original equipment manufacturer to change the design of the elevator 22 to achieve the benefits of the improved paddle 100 as described below.

The combination of the sloped fore and aft ends 102, 104 and rigid construction of the improved paddles 100 ensures a larger and more consistent grain pile (even at low flows) on each paddle. When using a mass flow type yield sensor, a greater and more consistent grain pile on each paddle will produce a stronger and more consistent signal when the grain pile is directed over or passes the mass flow sensor. It should be appreciated that the improved paddles 100 also direct a more contiguous grain layer over the mass flow sensor rather than scattering the grain, further improving the accuracy of the yield sensor signal, even at low flows. Furthermore the rigidity and sloped ends of the improved paddles 100 reduces scattering of the grain when the paddles pass over the upper sprocket 36 as compared to flexible, irregularly shaped conventional paddles.

By combining the benefits of the improved paddles 100 with a yield sensor 200 of the type disclosed in Applicant's co-pending International Patent Application No. PCT/US2012/050341 (the '341 application), the disclosure of which is incorporated herein in its by reference, further improvements in the accuracy of yield measurements can be achieved.

As disclosed in the '341 application, and as shown in FIG. 3, the yield sensor 200 is positioned in the elevator housing 32 such that the mass flow sensor 202 of the yield sensor 200 is located proximate the longitudinal axis 204 of the elevator 22 which passes through the central axis of the upper sprocket 36. The improved paddles 100 are particularly adapted to direct a greater portion and a more contiguous mass of grain upon leaving the paddle 100 toward the mass flow sensor 202. Because a greater and more consistent mass of grain with a more contiguous mass is directed toward the sensor 200, a greater portion of each grain pile contributes to the centrifugal force exerted on the mass flow sensor 202 as the grain contacts the sensor 202, thereby generating stronger and more consistent signals which correlate to more accurate yield measurements.

Various embodiments of the improved paddle 100 are illustrated in FIGS. 4A-4F. As previously identified, each of the embodiments of the improved paddles 100 include a generally flat or planar middle portion 106, and sloped fore and aft ends 102, 104. A slope angle Al defining the sloped aft end 104 may be between about 5 to 20 degrees. A horizontal distance between the rear and forward ends of the aft end 104 may be between 0.5 and 3 inches. A slope angle A2 defining the sloped fore end 102 may be between about 10 to 30 degrees. A horizontal distance between the rear and forward ends of the fore end 103 may be between 0.75 and 2 inches. A horizontal distance between the fore and aft ends of the paddle 100 may be between 3.5 and 5.5 inches. A slope angle A3 defining a sloped rearward portion of the middle portion 106 (in the embodiment of FIG. 4E in which the middle portion 106 is not entirely flat) may be between about 5 and 10 degrees. A total horizontal width of the paddle 100 may be between 4 and 5 inches. A rearward distance D1 between a central axis of a bolt mounting the paddle 100 to the chain 34 and a rearward end of the flat middle portion 106 may be between about 0 and 2 inches. A forward distance D2 between a central axis of a bolt mounting the paddle 100 to the chain 34 and a forward end of the middle portion 106 may be between about 0 and 1 inches. A rearward distance D3 between a rearward end of the sloped middle portion 106 and a forward end of the sloped middle portion 106 may be between about 0 and 0.5 inches. As previously identified, the sloped fore and aft ends 102, 104 enable each paddle to carry a greater and more consistent grain pile as the paddles scoop and lift the grain from the bottom of the elevator to the top of the elevator. Furthermore, the sloped aft end 104 (i.e., the end toward the rear of the combine as viewed in FIG. 1), assist in directing a greater and more contiguous mass of grain toward the sensor 202, as the grain leaves the paddle 100 as the paddle begins to pass around the upper sprocket 36.

Figure 5:
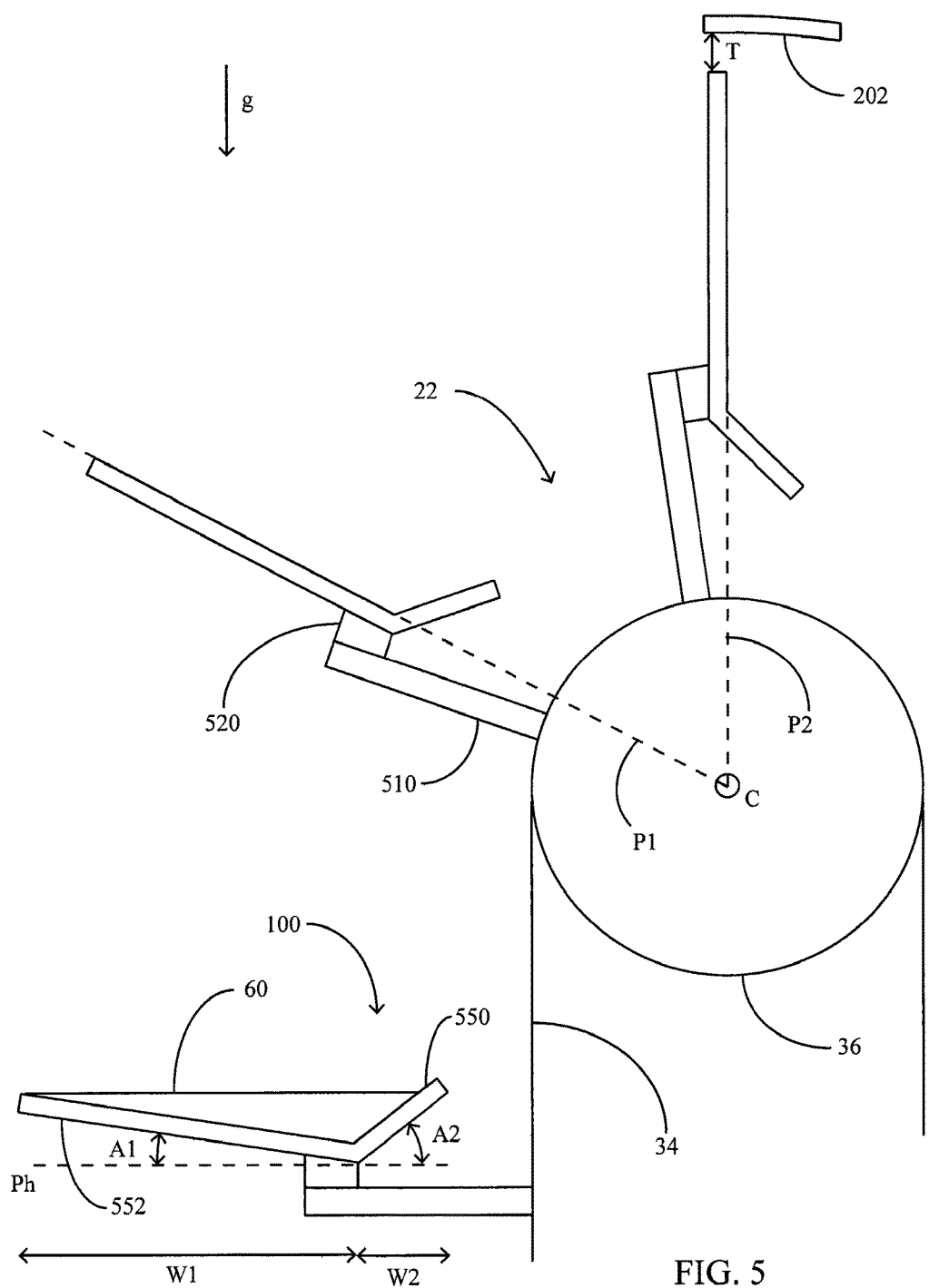
FIG. 5 is a side elevation view of another embodiment of an improved paddle shown in relation to the upper sprocket and chain of the clean grain elevator.

Another embodiment of the improved paddle 100 is illustrated in FIG. 5 attached to a chain 34 of an elevator 22 and carrying a grain pile 60. In this embodiment, the paddle 100 includes sloped fore and aft ends, 550, 552 configured such that the center of gravity of the grain pile 60 is located toward the fore end 550 of the paddle 100 as the grain is carried up the elevator.

The paddle 100 is attached to the chain 34 by a mounting arm 510 and a shim 520. Bolts or other suitable connectors (not shown) secure the paddle 100 to the mounting arm and shim 520. The shim 520 is configured such that angle of an upper surface of the shim and a vertical thickness of the shim affect the orientation of the paddle when mounted on the mounting portion 510. While the paddle 100 is carried up the elevator before reaching the upper sprocket 36, an angle A1 between the sloped aft end 552 and a plane Ph is preferably between 2 and 6 degrees and an angle A2 between the sloped fore end 550 and the plane Ph is preferably between 30 and 60 degrees such that the grain pile 60 is effectively cupped on the paddle between the sloped fore and aft ends 550, 552. A horizontal width W1 of the sloped aft end 552 may be about 4 inches. A horizontal width W2 of the sloped fore end 550 may be about 1 inch. It should be appreciated that the plane Ph is preferably normal to the direction of gravity (as indicated by arrow "g") such that in elevator embodiments in which the elevator is angled forward (e.g., by 7 degrees) the plane Ph defining the angles A1 and A2 is angled forward by the same angle (e.g., by 7 degrees). When the paddle 100 rounds the top of the upper sprocket 36, an upper surface of the sloped aft end 552 is preferably substantially co-planar to a plane (e.g., planes P1 or P2) intersecting a rotational axis C of the upper sprocket 36 such that the grain is allowed to slide freely off the paddle surface toward the sensor 200 while the paddle 100 rounds the upper sprocket 36. It should be appreciated that the thickness of the shim 520 and an angle of the upper surface of the shim are preferably selected such that the desired angle of the sloped aft end 552 relative to gravity is achieved both when the paddle 100 is being lifted up the elevator and when the paddle is rounding the top of the upper sprocket 36.

A distance T of a gap between the mass flow sensor 202 (e.g., a portion of a lower surface of a sensor plate supported for vertical deflection by deflector arms instrumented with strain gauges) may be between 0.6 and 0.9 inches. It should be appreciated that the surface of the mass flow sensor 202 is preferably curved with a constant radius about the upper sprocket 36 such that the distance T remains constant as the paddle 100 passes the mass flow sensor 202. Because the distance between the elevator chain 34 and the mass flow sensor 202 is constant for a given combine, the distance between the bolt location and the chain (e.g., the width of the mounting portion between the bolt location and the chain) and the horizontal width of the portion of the paddle 100 extending rearward of the bolt location (e.g., the width of the paddle rearward of the bolt location) is preferably controlled such that the desired gap distance T is achieved for a given combine. The improved paddle 100 of the embodiment of FIG. 5 may include angled sides similar to the angled sides as illustrated and described in reference to the embodiment of the improved paddle of FIGS. 6-8.

Figure 6:
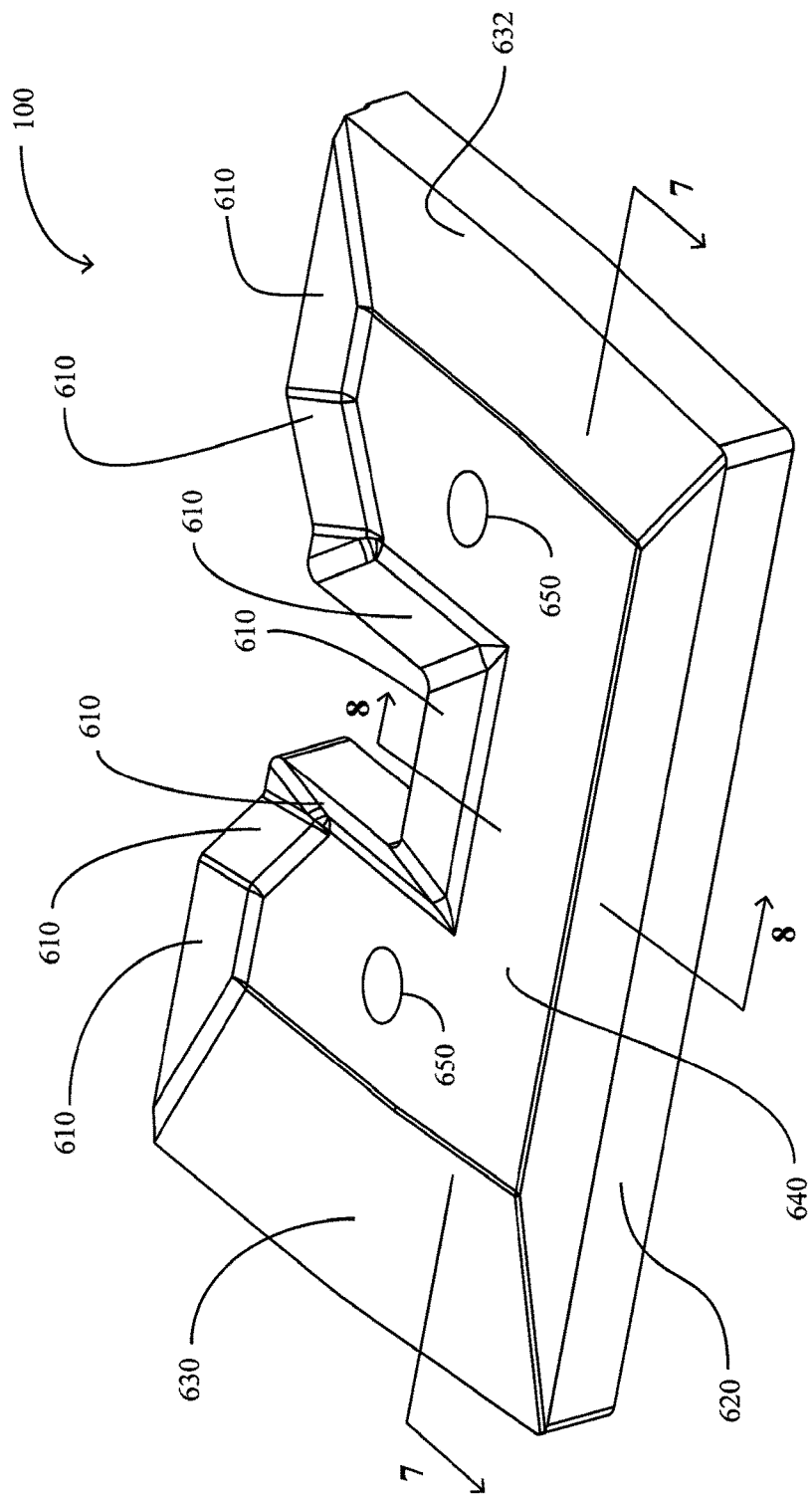
FIG. 6 is a top perspective view of another embodiment of an improved paddle.
Figure 7:
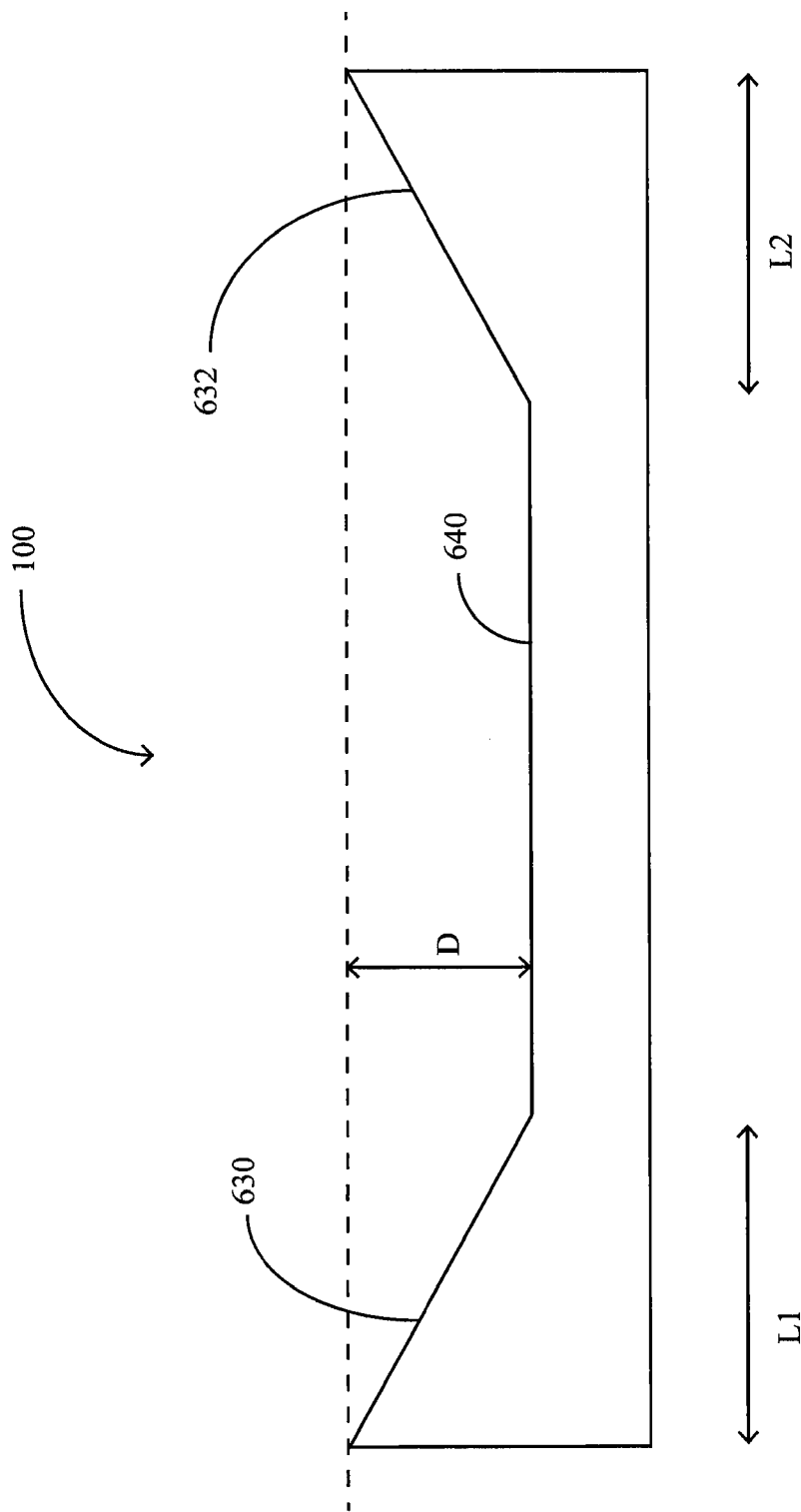
FIG. 7 is a cross-sectional view of the improved paddle of FIG. 6 as viewed along lines 7-7 of FIG. 6.
Figure 8:
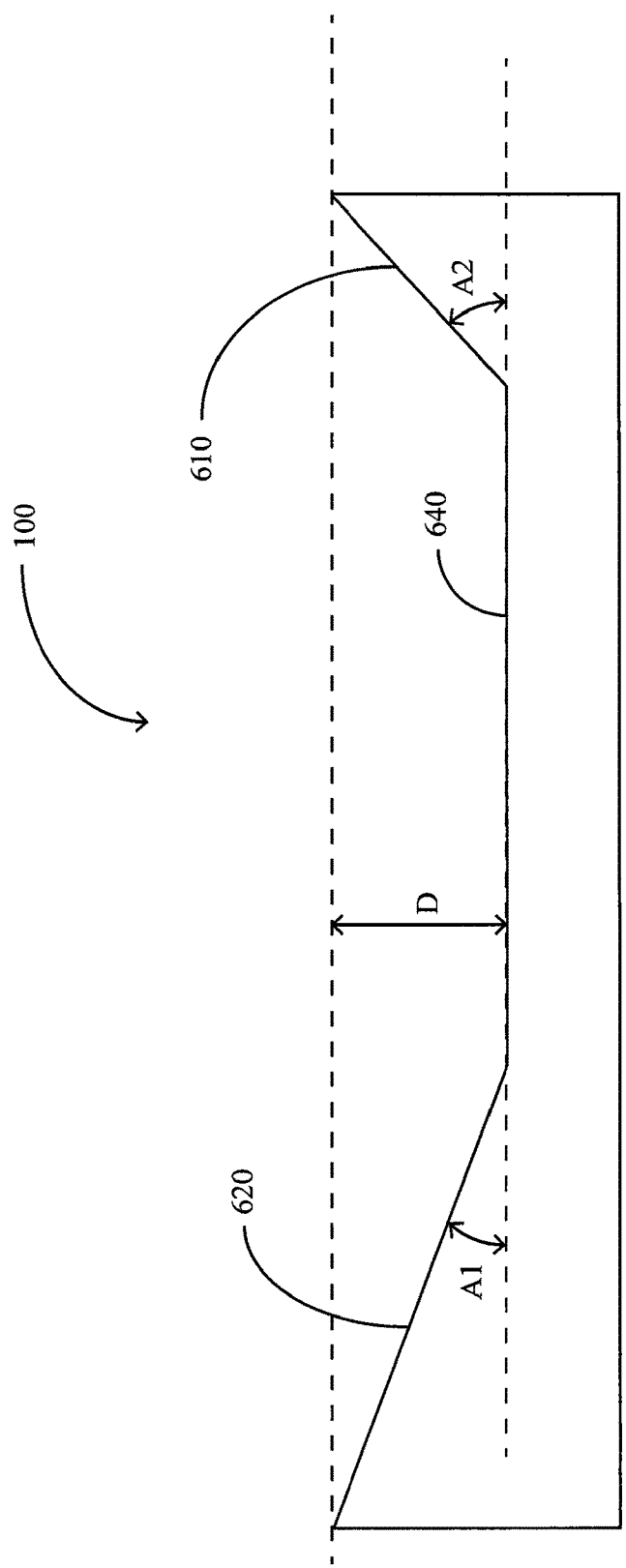
FIG. 8 is a cross-sectional view of the improved paddle of FIG. 6 as viewed along lines 8-8 of FIG. 6.

Yet another embodiment of the improved paddle 100 is illustrated in FIGS. 6-8. In this embodiment, the paddle 100 includes a sloped fore end 610, a sloped aft end 620, sloped sides 630, 632 and a floor 640. The sloped aft end 620 may be omitted such that grain thrown from the paddle 100 is not required to travel up the length of the sloped aft end before leaving the surface of the paddle. Mounting holes 650 enable the paddle to be mounted to the chain 34, e.g., by bolting to a mounting arm 510 as previously described in connection with the embodiment of FIG. 5.

Referring to FIG. 7, the sloped sides 630, 632 have a horizontal length L1, L2 which may be between 1 and 2 inches. The floor 640 is located at a depth D from a plane defined by the upper ends of the sloped sides 630, 632. The depth D is preferably between ⅛ and ¼ inch. In some embodiments, the upper ends of the sloped sides 630, 632 may have a different height. In such embodiments the depth D is defined by the depth from the horizontal plane of the upper end of the shorter sloped side.

Referring to FIG. 8, sloped aft end 620 is sloped at an angle A1 with respect to the plane of the floor 630 and the sloped fore end 610 (across the width of the fore periphery of the paddle 100), is sloped at an angle A2 with respect to the plane of the floor 630. The angle A1 (which may be less than 10 degrees) is less than the angle A2 (which may be between 25 and 40 degrees).

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A paddle attached to an elevator chain of a clean grain elevator of a combine harvester, the elevator chain disposed around an upper sprocket and a lower sprocket defining an elevator plane, the paddle comprising:
   a wear resistant, rigid, non-flexible body, whereby, when viewed in cross-section in a plane parallel with said elevator plane, said body includes:
      an aft surface which slopes at a aft angle upwardly relative to a perpendicular plane which is perpendicular to said elevator plane and in a direction away from the elevator chain, said aft surface having a first lateral aft end and a second lateral aft end disposed along a lateral aft plane extending laterally perpendicular to said elevator plane, said first and second lateral aft ends defining a lateral aft width;
      a fore surface which slopes at a fore angle upwardly relative to said perpendicular plane and in a direction toward the elevator chain, said fore surface having a first lateral fore end and a second lateral fore end disposed along a lateral fore plane extending laterally perpendicular to said elevator plane, said first and second lateral fore ends defining a lateral fore width;
      a first lateral side surface extending between said first lateral aft end and said first lateral fore end;
      a second lateral side surface extending between said second lateral aft end and said second lateral fore end.

2. The paddle of claim 1, wherein said first lateral side surface slopes upwardly relative to said perpendicular plane along a first transverse plane which is transverse to said lateral plane and said elevator plane, and wherein said second lateral side surface slopes upwardly relative to said perpendicular plane along a second transverse plane which is transverse to said lateral plane and said elevator plane.

3. The paddle of claim 1, wherein said paddle comprises polyethylene.

4. The paddle of claim 1, wherein said aft angle is between about 2 and 6 degrees with respect to said perpendicular plane.

5. The paddle of claim 1, wherein said fore angle is between about 30 and 60 degrees with respect to said perpendicular plane.

6. The paddle of claim 1, wherein said aft angle is less than about 10 degrees with respect to said perpendicular plane.

7. The paddle of claim 1, wherein said fore angle is between about 25 and 40 degrees with respect to said perpendicular plane.

8. A clean grain elevator for a combine harvester, comprising:
   an elevator housing;
   an upper sprocket disposed in said elevator housing;
   a lower sprocket disposed in said elevator housing, said upper and lower sprockets defining an elevator plane;
   a chain passing over and extending between said upper and lower sprockets; and
   a plurality of substantially equally spaced paddles attached to said chain, each of said paddles comprising a wear resistant, rigid body which retains its shape during use, whereby, when viewed in cross-section in a plane parallel with said elevator plane, said body includes:
      an aft surface which slopes at a aft angle upwardly relative to a perpendicular plane which is perpendicular to said elevator plane and in a direction away from the elevator chain, said aft surface having a first lateral aft end and a second lateral aft end disposed along a lateral aft plane extending laterally perpendicular to said elevator plane, said first and second lateral aft ends defining a lateral aft width;
      a fore surface which slopes at a fore angle upwardly relative to said perpendicular plane and in a direction toward the elevator chain, said fore surface having a first lateral fore end and a second lateral fore end disposed along a lateral fore plane extending laterally perpendicular to said elevator plane, said first and second lateral fore ends defining a lateral fore width;
      a first lateral side surface extending between said first lateral aft end and said first lateral fore end;
      a second lateral side surface extending between said second lateral aft end and said second lateral fore end.

9. The clean grain elevator of claim 8, wherein said first lateral side surface slopes upwardly relative to said perpendicular plane along a first transverse plane which is transverse to said lateral plane and said elevator plane, and wherein said second lateral side surface slopes upwardly relative to said perpendicular plane along a second transverse plane which is transverse to said lateral plane and said elevator plane.

10. The clean grain elevator of claim 8, wherein said aft angle is between about 2 and 6 degrees with respect to said perpendicular plane.

11. The clean grain elevator of claim 8, wherein said fore angle is between about 30 and 60 degrees with respect to said perpendicular plane.

12. The clean grain elevator of claim 8, wherein said aft angle is less than about 10 degrees with respect to said perpendicular plane.

13. The clean grain elevator of claim 8, wherein said fore angle is between about 25 and 40 degrees with respect to said perpendicular plane.

14. The clean grain elevator of claim 8, wherein as each of said plurality of paddles rounds said upper sprocket, said aft surface is substantially co-planar to a plane intersecting a rotational axis of said upper sprocket.

15. In combination, a grain elevator and a yield sensor:
the grain elevator comprising:
an elevator housing;
an upper sprocket disposed within said elevator housing;
a lower sprocket disposed within said elevator housing, said upper and lower sprockets defining an elevator plane;
a mass flow yield sensor positioned above said upper sprocket;
a chain passing over and extending between said upper and lower sprockets; and
a plurality of substantially equally spaced paddles attached to said chain, each of said paddles comprising a wear resistant, substantially rigid body, whereby, when viewed in cross-section in a plane parallel with said elevator plane, said body includes:
an aft surface which slopes at a aft angle upwardly relative to a perpendicular plane which is perpendicular to said elevator plane and in a direction away from the elevator chain, said aft surface having a first lateral aft end and a second lateral aft end disposed along a lateral aft plane extending laterally perpendicular to said elevator plane, said first and second lateral aft ends defining a lateral aft width;
a fore surface which slopes at a fore angle upwardly relative to said perpendicular plane and in a direction toward the elevator chain, said fore surface having a first lateral fore end and a second lateral fore end disposed along a lateral fore plane extending laterally perpendicular to said elevator plane, said first and second lateral fore ends defining a lateral fore width;
a first lateral side surface extending between said first lateral aft end and said first lateral fore end;
a second lateral side surface extending between said second lateral aft end and said second lateral fore end.

16. The combination of claim 15, wherein said aft angle is between about 2 and 6 degrees with respect to said perpendicular plane.

17. The combination of claim 15, wherein said fore angle is between about 30 and 60 degrees with respect to said perpendicular plane.

18. The combination of claim 15, wherein said aft angle is less than about 10 degrees with respect to said perpendicular plane.

19. The combination of claim 15, wherein said fore angle is between about 25 and 40 degrees with respect to said perpendicular plane.

20. The combination of claim 15, wherein as each of said plurality of paddles rounds said upper sprocket, said aft surface is substantially co-planar to a plane intersecting a rotational axis of said upper sprocket, whereby grain is allowed to slide freely off said aft surface toward said mass flow yield sensor as said paddle rounds said upper sprocket.

* * * * *